United States Patent [19]

Kijima et al.

[11] Patent Number: 5,016,903
[45] Date of Patent: May 21, 1991

[54] VEHICLE SUSPENSION SYSTEM

[75] Inventors: Takao Kijima; Haruyuki Taniguchi; Makoto Arai; Nobuyuki Sugitani, all of Hiroshima, Japan

[73] Assignee: Mazda Motor Corporation, Hiroshima, Japan

[21] Appl. No.: 528,486

[22] Filed: May 25, 1990

[30] Foreign Application Priority Data

May 29, 1989 [JP] Japan .................................. 64-136380
Oct. 24, 1989 [JP] Japan .......................... 64-124902[U]

[51] Int. Cl.[5] ............................................. B60G 7/02
[52] U.S. Cl. ................................... 280/663; 280/671; 280/673; 280/691; 280/716; 267/258; 267/293; 403/228
[58] Field of Search ................ 280/660, 661, 663, 673, 280/675, 688, 690, 691, 695, 700, 716, 717, 721, 664, 671; 403/224, 225, 228; 267/279, 280, 281, 292, 293, 257, 258

[56] References Cited

U.S. PATENT DOCUMENTS 3,526,413  9/1970  Muller .................................. 280/661
4,132,430  1/1979  Bantle .................................. 280/673
4,280,717  7/1981  Hanai et al. ......................... 280/663
4,695,073  9/1987  Pettibone et al. .................... 280/661

FOREIGN PATENT DOCUMENTS 1937320  2/1971  Fed. Rep. of Germany .
3619755  12/1986  Fed. Rep. of Germany .
62-11203  3/1987  Japan .

Primary Examiner—Charles A. Marmor
Assistant Examiner—Tamara L. Finlay
Attorney, Agent, or Firm—Sixbey, Friedman, Leedom & Ferguson

[57] ABSTRACT

A vehicle suspension system includes an arm member whose outer end is connected to a wheel and whose inner end is connected to the vehicle body by way of front and rear rubber bushings at positions spaced from each other in the longitudinal direction of the vehicle body so that the arm member can vertically rotate relative to the vehicle body. Each of the front and rear rubber bushings has an outer tubular member which is substantially cylindrical and extends in the longitudinal direction of the vehicle body, an inner tubular member which is received in the outer tubular member substantially coaxially therewith, and a rubber member interposed between the inner and outer tubular member. One of the inner and outer tubular members is connected to the vehicle body and the other is connected to the suspension arm. The inner and outer tubular members of one of the front and rear rubber bushings is slidable relative to each other in the axial direction of the tubular members and those of the other rubber bushing are not slidable relative to each other in the axial direction of the tubular members.

7 Claims, 3 Drawing Sheets

VEHICLE SUSPENSION SYSTEM

BACKGROUND OF THE INVENTION

1. Field of the Invention

This invention relates to a vehicle suspension system, and more particularly to a vehicle suspension system in which suspension arms are connected to the vehicle body by way of rubber bushings.

2. Description of the Prior Art

There has been known a vehicle suspension system which includes a suspension arm whose outer end is connected to a wheel and whose inner end is connected to the vehicle body by way of a rubber bushing so that the suspension arm can vertically rotate relative to the vehicle body. In such a suspension system, it is required that the stiffness of the rubber bushing in the longitudinal direction of thereof, i.e., in the longitudinal direction of the vehicle body, is small in order to enhance the damping capacity against longitudinal vibrations and impacts transmitted to the suspension arm from the road surface during running, thereby improving the driving comfort, and that the stiffness of the rubber bushing in the transverse direction thereof, i.e., the transverse direction of the vehicle body, is large in order to increase the lateral stiffness of the suspension system and improve the driving stability.

In order to meet the requirement, there have been proposed various suspension systems. For example, in the suspension system disclosed in Japanese Utility Model Publication No. 62-11203, tubular portions are formed on the inner end portion of the suspension arm respectively at front and rear portions of the inner end portion and a pair of rubber bushings are respectively mounted on the tubular portions, each of the rubber bushings being a slide bushing having outer and inner tubular members which are slidable relative to each other in the longitudinal direction of the bushing, and at the same time, a hard rubber member is interposed between the outer and inner tubular members of each of the rubber bushings so that the stiffness of the rubber bushing in the transverse direction of the vehicle body is increased, and a soft rubber member which abuts against an end face of the tubular portion on the inner end portion of the suspension arm (e.g., the rear end face) is provided on each of the rubber bushings so that the stiffness of the rubber bushing in the longitudinal direction of the vehicle body reduced.

However, this arrangement is disadvantageous in that since it is actually very difficult to set the hardness of the soft rubber member as desired, the urging force of the soft rubber memeber which acts on the tubular portion on the inner end portion of the suspension arm upon axial displacement thereof cannot be properly set in view of the driving comfort of the vehicle and the tubular portion cannot be quickly returned to the original position under the force of the soft rubber member.

Further, if coil springs the spring constants of which can be freely set are employed in order to absorb longitudinal impacts instead of the soft rubber bushings, each connection of the suspension arm to the vehicle body inherently becomes too large in length though the stiffness of the connection can be freely set. On the other hand, when the length of the coil spring is limited in order to shorten the connection of the suspension arm to the vehicle body, it becomes very difficult to properly set the spring constant and the urging force of the coil spring, and at the same time, parts of the coil spring interfere with each other when the coil spring is compressed, thereby shortening the service life of the coil spring.

SUMMARY OF THE INVENTION

In view of the foregoing observations and description, the primary object of the present invention is to provide a vehicle suspension system which is relatively compact and can effectively absorb impacts in the longitudinal direction of the vehicle body with the stiffness in the transverse direction of the vehicle body kept sufficient.

In accordance with the present invention, there is provided a vehicle suspension system comprising an arm member whose outer end is connected to a wheel and whose inner end is connected to the vehicle body by way of front and rear rubber bushings at positions spaced from each other in the longitudinal direction of the vehicle body so that the arm member can vertically rotate relative to the vehicle body characterized in that each of the front and rear rubber bushings comprises an outer tubular member which is substantially cylindrical and extends in the longitudinal direction of the vehicle body, an inner tubular member which is received in the outer tubular member substantially coaxially therewith, and a rubber member interposed between the inner and outer tubular member, and one of the inner and outer tubular members is connected to the vehicle body and the other is connected to the suspension arm, the inner and outer tubular members of one of the front and rear rubber bushings being slidable relative to each other in the axial direction of the tubular members and those of the other rubber bushing not being slidable relative to each other in the axial direction of the tubular members.

With this arrangement, only the elastic counterforce of the rubber member of said the other rubber bushing in the longitudinal direction thereof acts as resistance to displacement of the arm member in the longitudinal direction of the vehicle body (such a direction as to shear the rubber member) and said one rubber bushing the inner and outer tubular members of which are slidable relative to each other produces no counterforce to the displacement of the arm member. Accordingly, the total resistance to the displacement of the arm member in the longitudinal direction of the vehicle body, that is, the sum of the longitudinal stiffness of the front and rear rubber bushings can be so limited as to improve absorption of the longitudinal impacts. The stiffness of the rubber bushings in the transverse direction can be made satisfactory by properly setting the hardness of the rubber members.

DESCRIPTION OF THE PREFERRED EMBODIMENT

Figure 1:
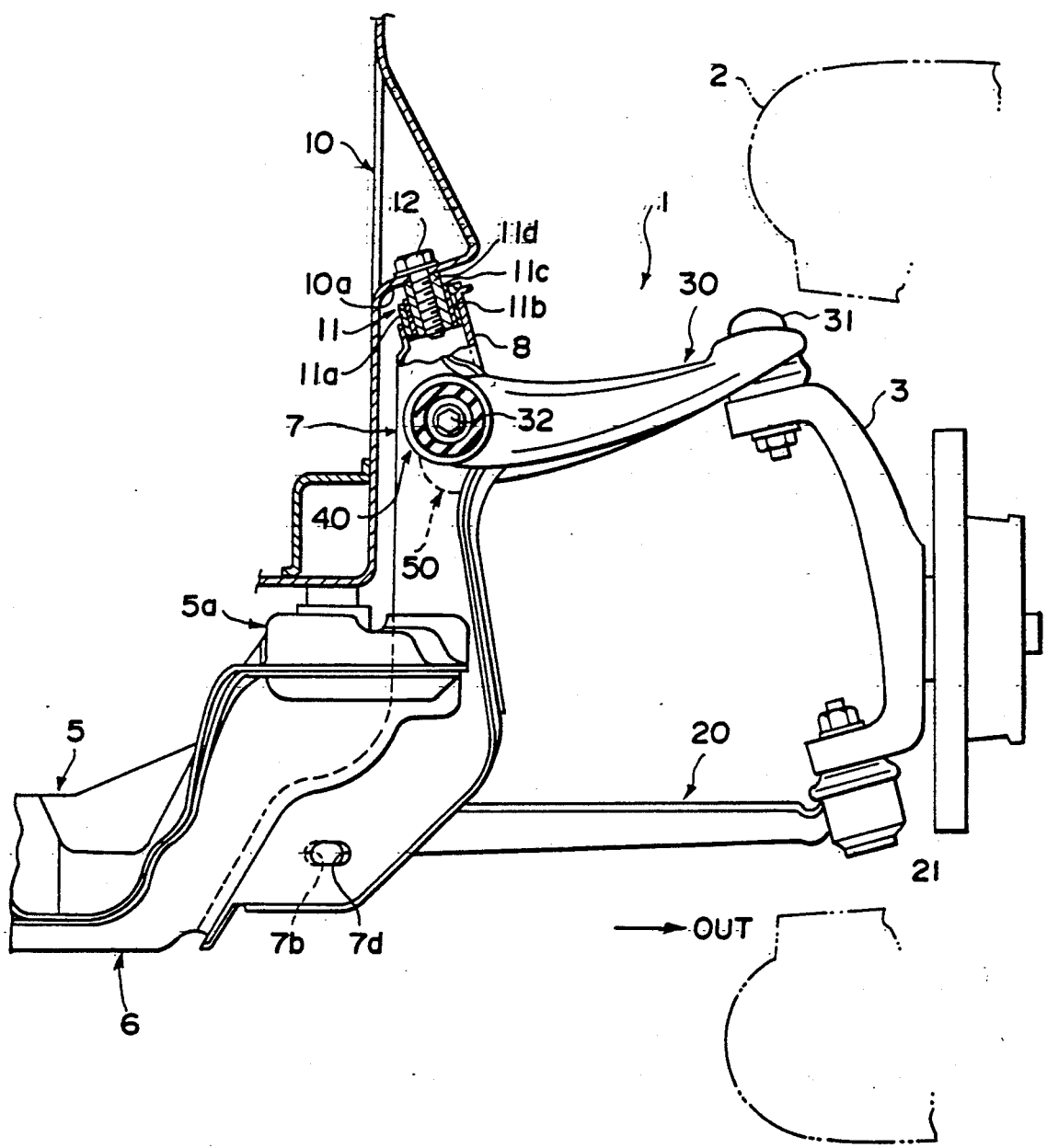
FIG. 1 is a front view of a suspension system in accordance with an embodiment of the present invention.
Figure 2:
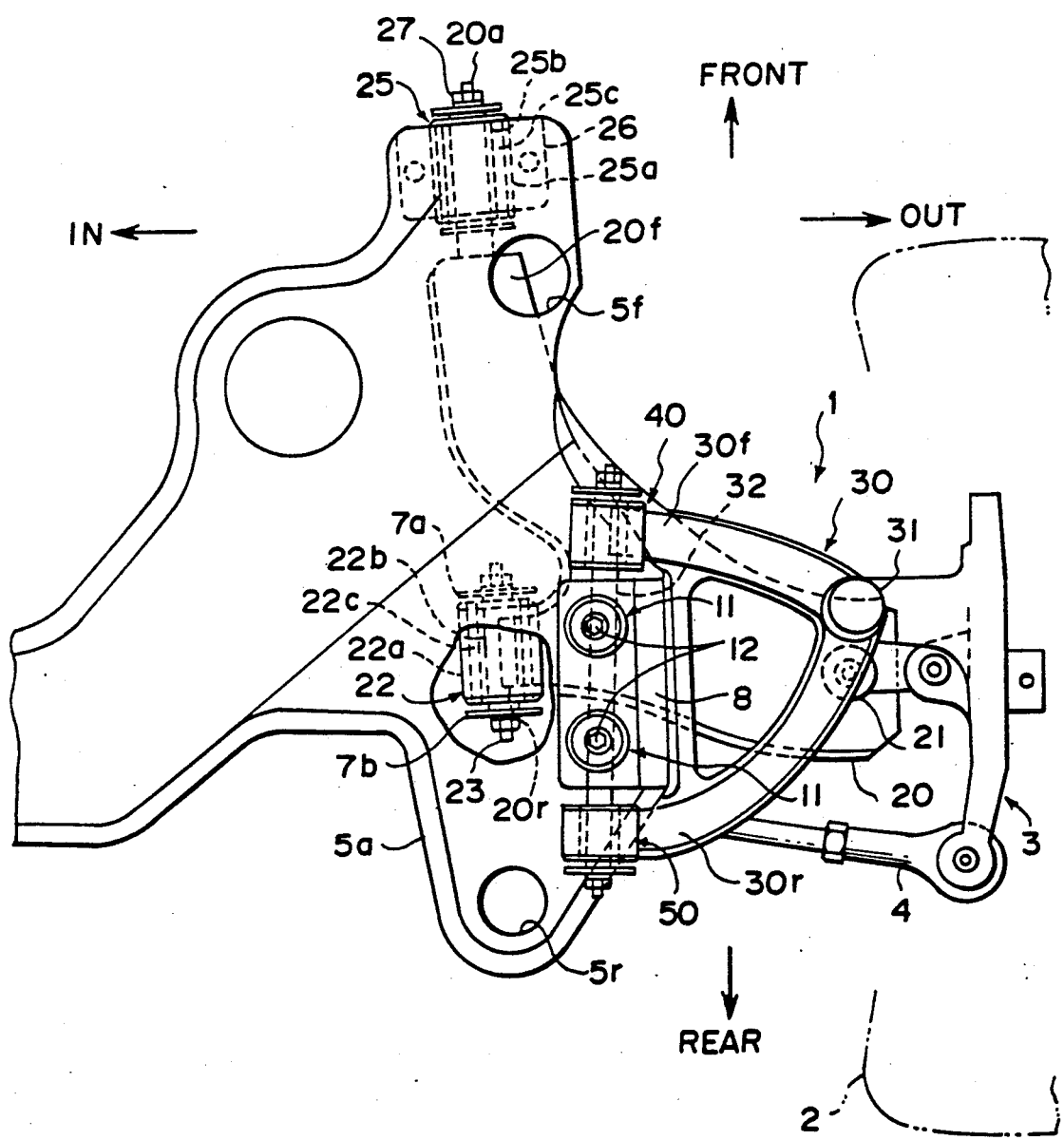
FIG. 2 is a plan view of the suspension system.

In FIGS. 1 and 2, a front suspension system 1 in accordance with an embodiment of the present invention comprises a knuckle 3 which supports a wheel 2 for rotation, and upper and lower arms 30 and 20 which respectively connect upper and lower portions of the knuckle 3 to the vehicle body. The outer end of the lower arm 20 is connected to the knuckle 3 by way of a ball joint 21 and the outer end of the upper arm 30 is connected to the knuckle 3 by way of a ball joint 31. A tie rod 4 is connected to the rear end of the knuckle 3.

The inner end portion of the lower arm 20 is bifurcated into front and rear inner end portions. The inner end 20f of the front inner end portion and the inner end 20r of the rear inner end portion are mounted on a cross member 5 which extends in the transverse direction of the vehicle body 10 and is fixed thereto. A suspension mounting portion 5a which may be a welded structure, for instance, and has a predetermined size as measured in the longitudinal direction of the vehicle body 10. A reinforcement 6 which extends in the transverse direction of the vehicle body 10 along the cross member 5 is welded to the lower surface of the cross member 5. Mounting holes for fastening the cross member 5 to the vehicle body 10 are formed near the front and rear ends of the suspension mounting portion 5a. An arm bracket 7 which is substantially U-shaped in cross-section and extends vertical is welded to an intermediate portion of the suspension mounting portion 5a in order to support the lower arm 20 and the upper arm 30. Lower arm supporting portions 7a and 7b each having an elongated opening which extends in the longitudinal direction of the vehicle body through the front and rear walls of the arm bracket 7 are formed in the lower portion of the arm bracket 7. The inner end 20r of the rear inner end portion of the lower arm 20 is mounted on the lower arm supporting portions 7a and 7b by way of a rubber bushing 22.

The rubber bushing 22 comprises a cylindrical outer tubular member 22a, an inner tubular member 22b which is received in the outer tubular member 22a substantially coaxially therewith, and a rubber member 22c interposed between the outer and inner tubular members 22a and 22b. The outer tubular member 22a is fixed to the inner end 20r of the rear inner end portion of the lower arm 20, and the inner tubular member 22b is mounted on the arm bracket 7 by a bolt member 23 which extends through the inner tubular member 22b and is fastened to the lower arm supporting portions 7a and 7b at respective end portions.

The inner end 20f of the front inner end portion of the lower arm 20 is mounted on the front end of the suspension mounting portion 5a of the cross member 5 by way of a rubber bushing 25. The rubber bushing 25 is similar to the rubber bushing 22 and comprises a cylindrical outer tubular member 25a, an inner tubular member 25b which is received in the outer tubular member 25a substantially coaxially therewith, and a rubber member 25c interposed between the outer and inner tubular members 25a and 25b. The outer tubular member 25a is fixed to the suspension mounting portion 5a by way of a metal mount 26, and the inner tubular member 25b is mounted on the lower arm 20 by a bolt portion 20a which is formed on the inner end 20f of the front inner end portion of the lower arm 20 and passed through the inner tubular member 25b, and a nut 27 which tightened on the bolt portion 20a.

Since the rubber bushings 22 and 25 are of a well-known type, their structure will not be described in detail here.

An upper bracket 8 which also functions as a reinforcement for the upper portion of the arm bracket 7 is welded to the outer surface of the upper portion of the arm bracket 7, and a pair of rubber bushings 11 which are aligned with each other substantially in the longitudinal direction of the vehicle body are mounted on the upper end portions of the upper bracket 8 and the arm bracket 7. Each of the rubber bushings 11 comprises an outer tubular member 11a which is welded to the upper ends of the arm bracket 7 and the upper bracket 8, an inner tubular member 11b which is provided with an internal thread 11d on the inner surface thereof and projects upward beyond the outer tubular member 11a, and a rubber member 11c interposed between the outer and inner tubular members 11a and 11b. A bracket supporting portion 10a formed on the vehicle body 10 is positioned above the arm bracket 7 and the upper bracket 8, and each rubber bushing 11 is fixed to the bracket supporting portion 10a by a bolt 12 which is screwed into the internal thread 11d of the inner tubular member 11b, whereby the upper end of the arm bracket 7 is supported on the bracket supporting portion 10a.

A long bolt member 32 extends through the upper portion of the arm bracket 7 substantially in the longitudinal direction of the vehicle body. The upper arm 30 comprises front and rear arm portions, and the inner ends 30f and 30r of the arm portions respectively connected to the front and rear end portions of the bolt member 32 by way of rubber bushings 40 and 50.

The rubber bushings 40 and 50 will be described in detail with reference to FIG. 3, hereinbelow.

Figure 3:
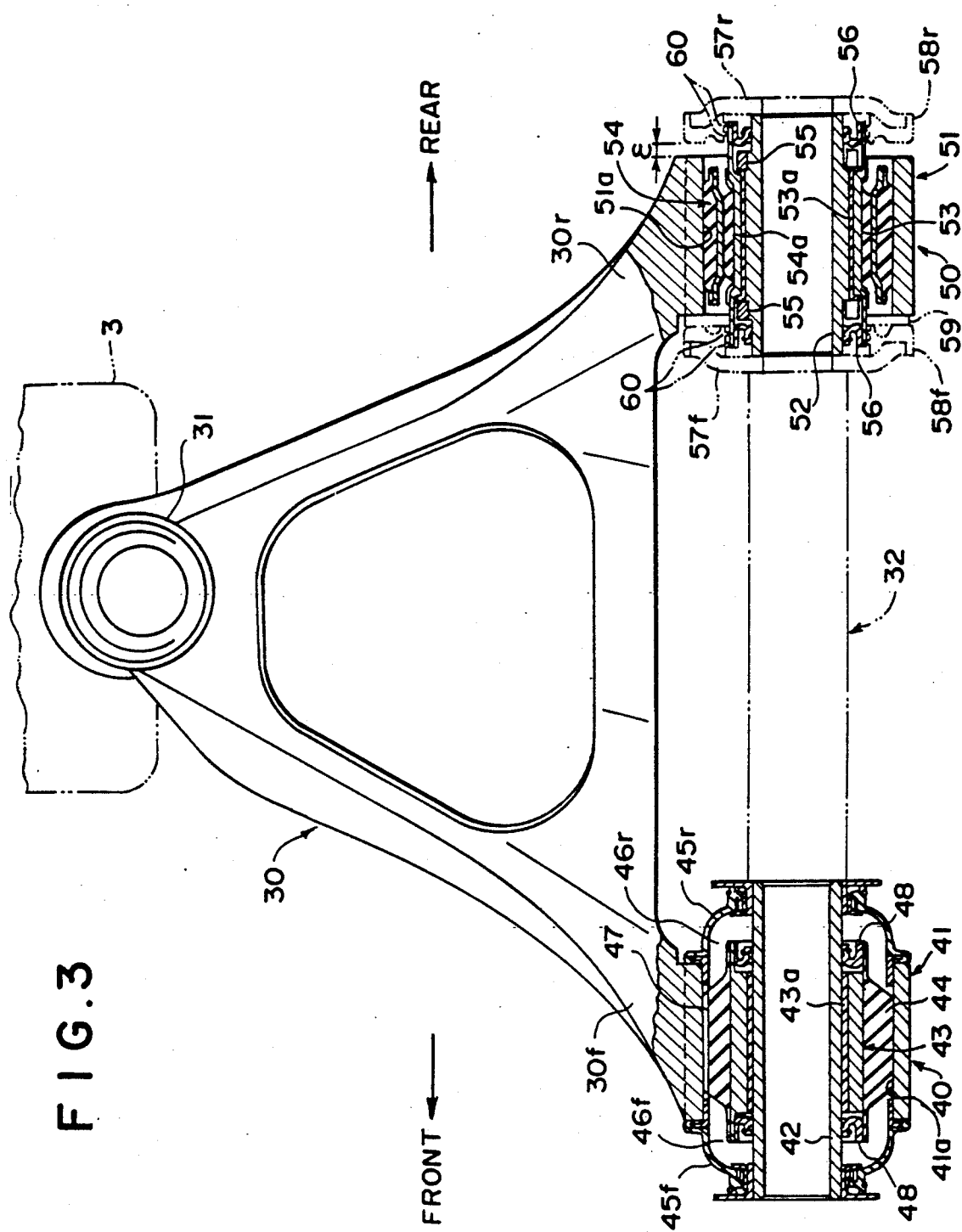
FIG. 3 is a plan view partly in cross-section of the upper arm of the suspension system.

As shown in FIG. 3, a tubular portion 41 having a through hole 41a extending in the longitudinal direction of the vehicle body is formed on the inner end 30f of the front arm portion of the upper arm 30, and a tubular portion 51 having a through hole 51a extending in the longitudinal direction of the vehicle body is formed on the inner end 30r of the rear arm portion of the upper arm 30. The tubular portions 41 and 51 respectively form the outer tubular members of the rubber bushings 40 and 50. The forward rubber bushing 40 comprises an inner tubular member 42 which is fitted on the front end portion of the bolt member 32 coaxially with the outer tubular member 41, an intermediate tubular member 43 fitted on the inner tubular member 42, and a rubber member 44 interposed between the intermediate tubular member 43 and the outer tubular member 41. The outer peripheral surface of the intermediate tubular member 43 is fixed to the outer tubular member 41 by way of the rubber member 44. A coating layer 43a of material which is excellent in sliding properties such as ethylene tetrafluoride is formed on the inner surface of the intermediate tubular member 43, and the intermediate tubular member 43 is slidable in the longitudinal direction and rotatable relative to the inner tubular member 42.

A pair of seal boots 45f and 45r are mounted between the outer tubular member 41 and the inner tubular member 42 on opposite ends of the rubber bushing 40, whereby front and rear enclosed chambers 46f and 46r are formed. The seal boots 45f and 45r may be of rubber, for example. A communicating passage 47 in the form of a groove extends in the longitudinal direction of the rubber bushing 40 on the outer surface of the rubber member 44 and communicates the front and rear enclosed chambers 46f and 46r with each other. Further, a pair of seal members 48 are mounted between the inner tubular member 42 and the intermediate tubular member 43 on opposite ends of the inner tubular member 42, and seal the sliding surfaces between the inner tubular member 42 and the intermediate tubular member 43 together with the seal boots 45f and 45r.

On the other hand, the rearward rubber bushing 50 comprises outer, inner and intermediate tubular members 51, 52 and 53 and a rubber member 54 similarly to the forward rubber bushing 40. The outer surface of the intermediate tubular member 53 is fixed to the outer tubular member 51 by way of the rubber member 54, and a coating layer 53a similar to that on the intermediate tubular member 43 of the forward rubber bushing 40 is formed on the inner surface of the intermediate tubular member 53. A pair of dust seal members 56 are mounted between the inner tubular member 52 and the intermediate tubular member 53 on opposite ends of the inner tubular member 52.

The rearward rubber bushing 50 differs from the forward rubber bushing 40 in that a pair of stopper rings 55 are fixed to the inner tubular member 52 on opposite ends of the coating layer 53a to prevent the intermediate tubular member 53 from sliding in the longitudinal direction of the rubber bushing 50 relative to the inner tubular member 52. Rotation of the intermediate tubular member 53 relative to the inner tubular member 52 is permitted.

Front and rear cover plates 57f and 57r are fixed to opposite ends of the inner tubular member 52 of the rearward rubber bushing 50. A pair of annular rubber stoppers 58f and 58r are fixed to the inner surfaces of the cover plates 57f and 57r near the outer peripheral edges. A disk-like spacer plate 59 is interposed between the front rubber stopper 58f and the front end face of the outer tubular member 51, and a space of a predetermined width ε is provided between the rear rubber stopper 58r and the rear end face of the outer tubular member 51. From the inner peripheral surface of each of the rubber stoppers 58f and 58r projects a sealing portion 60 which abuts against the outer surface of the intermediate tubular member 53 to seal, together with the seal members 56, the outer surface of the inner tubular member 52 and the inner surface of the intermediate tubular member 53.

A cylindrical core material 54a which is small in thickness is embedded in the rubber member 54. The stiffnesses of the rubber member 54 in the axial direction and the direction perpendicular to the axial direction can be adjusted by changing the position of the core material 54a and/or the thickness of the core material 54a.

The operation of the rubber bushings 40 and 50 will be described hereinbelow.

When an impact load acts on the upper arm 30 in the longitudinal direction of the vehicle body 10 (the axial direction of the rubber bushings 40 and 50) and the upper arm 30 is displaced in the axial direction of the rubber bushings 40 and 50 while the vehicle is running, no counterforce is produced in the forward rubber bushing 40 since the outer tubular member 41 and the intermediate tubular member 43 are slidable in the axial direction relative to the inner tubular member 42 and only the elastic counterforce of the rubber member 54 of the rearward rubber bushing 50 in its axial direction (such a direction as to shear the rubber member 54) acts as substantial resistance to the displacement of the upper arm 30. Accordingly, the total resistance to the displacement of the upper arm 30 in the longitudinal direction of the vehicle body, that is, the sum of the axial stiffnesses of the forward and rearward rubber bushings 40 and 50 can be so limited as to improve absorption of the longitudinal impacts.

Since the transverse modulus of rubber (the modulus in such a direction as to shear the rubber) is normally smaller than the longitudinal modulus, impacts in the longitudinal direction of the vehicle body can be effectively absorbed with the stiffness in the transverse direction of the vehicle body kept sufficient and at the same time the upper arm 30 can be quickly returned to the original position upon removal of the load when the stiffness of the rubber member 54 of the rearward rubber bushing 50 is properly set. The reason why a space is provided between the rubber stopper and the end face of the outer tubular member 51 only on the rear side thereof is that a longitudinal impact load transmitted to the suspension arm during running normally acts from the front to the rear. Displacement of the upper arm 30 larger than the predetermined width ε is prevented by abutment of the rear end face of the outer tubular member 51 of the rearward rubber bushing 50 against the rearward rubber stopper 58r.

The stiffness of the rubber bushings 40 and 50 in the transverse direction can be set as desired by properly setting the hardness of the rubber members 44 and 54.

Since only the forward rubber bushing 40 is a slide bushing, the suspension system of this embodiment can be relatively compact.

The space between the inner tubular member 42 and the outer tubular member 41 is enclosed by the seal boots 45f and 45r at opposite ends of the rubber bushing 40 dust cannot enter the space between the inner tubular member 42 and the intermediate tubular member 43, and accordingly, the sliding action of the intermediate tubular member 43 can be kept good. Further, in this particular embodiment, since the pair of seal members 48 are mounted between the inner tubular member 42 and the intermediate tubular member 43 on opposite ends of the inner tubular member 42 and the space between the inner tubular member 42 and the outer tubular member 41 is doubly enclosed, entrance of duct is prevented with a better certainty.

Further since the front and rear enclosed chambers 46f and 46r formed by the seal boots 45f and 45r communicate with each other by way of the communicating passage 47, air flows from one of the chambers to the other through the communicating passage 47 when the intermediate tubular member 43 (together with the outer tubular member 41) moves in the axial direction relative to the inner tubular member 42. As a result, pressure change in the enclosed chambers 46f and 46r can be suppressed and accordingly, the seal boots 45f and 45r are prevented from coming off the rubber bushing 40 or breaking down.

Though, in the embodiment described above, the forward rubber bushing 40 is a slide bushing and the rearward rubber bushing 50 is not a slide bushing, either one of the forward and rearward rubber bushings 40 and 50 may be a slide bushing so long as the other is not a slide bushing.

We claim:

1. A vehicle suspension system comprising an arm member whose outer end is connected to a wheel and whose inner end is connected to the vehicle body by way of front and rear rubber bushings at positions spaced from each other in the longitudinal direction of the vehicle body so that the arm member can vertically rotate relative to the vehicle body characterized in that
    each of the front and rear rubber bushings comprises
        an outer tubular member which is substantially cylindrical and extends in the longitudinal direction of the vehicle body, an inner tubular member which is received in the outer tubular member substantially coaxially therewith, and a rubber member interposed between the inner and outer tubular member, and one of the inner and outer tubular members is connected to the vehicle body and the other is connected to the suspension arm, the inner and outer tubular members of one of the front and rear rubber bushings being slidable relative to each other in the axial direction of the tubular members and those of the other rubber bushing not being slidable relative to each other in the axial direction of the tubular members.

2. A vehicle suspension system as defined in claim 1 in which said one of the rubber bushings further comprising an intermediate tubular member which is fitted on the inner tubular member coaxially therewith between the inner tubular member and the rubber member, and is slidable relative to the inner tubular member in the axial direction of the tubular members and rotatable about the inner tubular member, the intermediate tubular member being connected to the outer tubular member by way of the rubber members.

3. A vehicle suspension system as defined in claim 2 in which the inner surface of said intermediate tubular member is provided with a coating of material which is excellent in sliding properties.

4. A vehicle suspension system as defined in claim 2 in which a pair of seal boots are mounted between the outer tubular member and the inner tubular member on opposite ends of said one of the rubber bushings so that front and rear enclosed chambers are formed between the seal boots and the respective ends of the tubular members.

5. A vehicle suspension system as defined in claim 4 in which a pair of seal members are mounted between the inner tubular member and the intermediate tubular member on opposite ends of the inner tubular member and in the respective enclosed chambers.

6. A vehicle suspension system as defined claim 4 in which said front and rear enclosed chambers communicate with each other by way of a communicating passage.

7. A vehicle suspension system as defined in claim 6 in which said communicating passage is in the form of a groove which is formed on the outer surface of the inner tubular member and extends in the axial direction of the inner tubular member.

* * * * *